United States Patent [19]
Mintgen

[11] Patent Number: 5,174,551
[45] Date of Patent: Dec. 29, 1992

[54] CYLINDER PISTON DEVICE

[75] Inventor: Rolf Mintgen, Thür, Fed. Rep. of Germany

[73] Assignee: Stabilus GmbH, Koblenz-Neuendorf, Fed. Rep. of Germany

[21] Appl. No.: 717,311

[22] Filed: Jun. 18, 1991

[30] Foreign Application Priority Data

Jun. 20, 1990 [DE] Fed. Rep. of Germany ....... 4019578

[51] Int. Cl.$^5$ .............................................. F16F 11/00
[52] U.S. Cl. ..................................... 267/120; 92/168; 92/253; 188/129; 188/271; 188/322.18; 188/381; 267/201
[58] Field of Search ...................... 188/322.16, 322.17, 188/322.18, 271, 381; 92/168, 253; 267/120, 129, 201, 202, 203

[56] References Cited

U.S. PATENT DOCUMENTS

| | | | |
|---|---|---|---|
| 2,752,149 | 6/1956 | Forcellini | 188/129 X |
| 2,962,330 | 11/1960 | Kohl | 92/253 X |
| 3,104,916 | 9/1963 | Dowling et al. | 188/322.17 X |
| 3,260,515 | 7/1966 | Albers . | |
| 3,368,650 | 2/1968 | Wastell | 188/322.17 X |
| 3,870,381 | 3/1975 | Overkoff | 92/168 X |
| 4,779,845 | 10/1988 | Bastesch et al. | 267/120 |
| 4,792,127 | 12/1988 | Kortgen | 267/64.15 |
| 4,881,723 | 11/1989 | Bauer et al. | 188/221 |
| 4,944,498 | 7/1990 | Kortgen et al. | 188/322.17 X |

FOREIGN PATENT DOCUMENTS

| | | |
|---|---|---|
| 1903993 | 8/1970 | Fed. Rep. of Germany . |
| 2421007 | 11/1975 | Fed. Rep. of Germany . |
| 2834649 | 2/1980 | Fed. Rep. of Germany . |
| 2942716 | 5/1981 | Fed. Rep. of Germany . |
| 2622879 | 11/1982 | Fed. Rep. of Germany . |
| 502121 | 5/1985 | Fed. Rep. of Germany . |
| 3627816 | 2/1988 | Fed. Rep. of Germany . |
| 1488878 | 7/1967 | France . |
| 2164158 | 7/1973 | France . |
| 2306377 | 10/1976 | France ............ 188/322.16 |

Primary Examiner—George E. A. Halvosa
Attorney, Agent, or Firm—Brumbaugh, Graves, Donohue & Raymond

[57] ABSTRACT

A cylinder piston device comprises a cylinder and a piston rod. The piston rod is guided through one end of the cylinder inwards and outwards of the cylinder. A damping body is provided for damping the axial movement of the piston rod with respect to the cylinder. This damping body is deflectable in response to change of direction of the axial movement. A deflection of the damping body results in change of the frictional resistance.

14 Claims, 2 Drawing Sheets

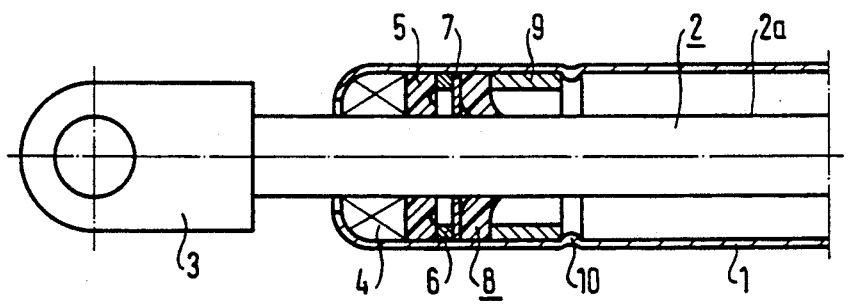
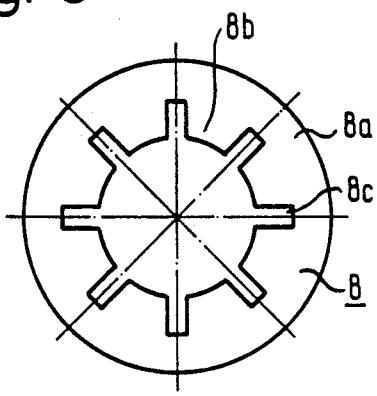
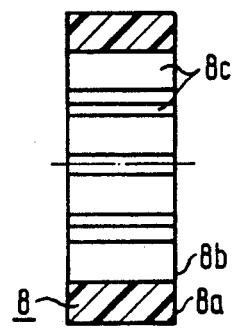
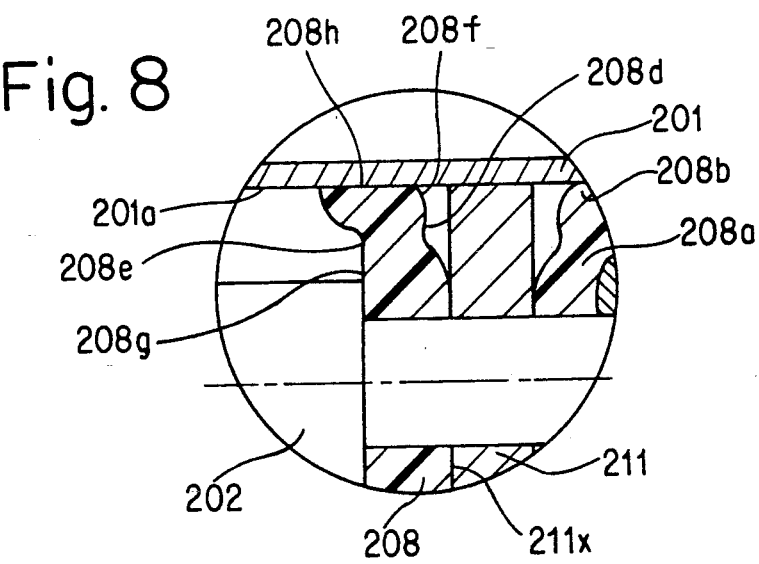

CYLINDER PISTON DEVICE

BACKGROUND OF THE INVENTION

This invention relates to a cylinder piston device in which the movement of the piston rod with respect to the cylinder is frictionally damped. Such cylinder piston devices are used e.g. as gas springs provided for facilitating the lifting movement of a trunk lid in a motor-vehicle. They may be used, however, also as frictional dampers e.g. in washing machines. Moreover, they may be constructed as combined dampers which have both a frictional and a fluidic damping.

STATEMENT OF THE PRIOR ART

From German Utility Model 85 02 121 a gas spring is known in which the piston rod is introduced through an end portion of a cylinder. Adjacent this end portion of the cylinder, an annular friction element is provided which may be compressed in axial direction. By the compression of the annular friction element this element is brought in frictional contact with the cylindrical surface of the piston rod so that a frictional action is exerted onto the piston rod, when the piston rod is moved in axial direction with respect to the cylinder.

From U.S. Pat. No. 4,881,723 a gas spring is known in which a piston accommodated within the cavity of a cylinder is provided with an annular friction member frictionally engaging the internal cylindrical face of the cylinder.

From German Publication 36 27 816, corresponding to U.S. Pat. No. 4,792,127, a gas spring is known in which an annular friction member is fixed to a piston rod, and a mechanical spring provided radially inwards of the annular friction member radially urges the friction member towards the internal cylindrical face of the cylinder.

Further frictionally damped cylinder piston devices are known from French Publication 2 164 158, French Patent 1 488 878, German Publication 29 42 716, German Patent 26 22 879 and German Publication 24 21 007.

OBJECT OF THE INVENTION

It is a primary object of the invention to provide a frictionally damped cylinder piston device in which the damping action can be adapted to varying need for damping action for different directions of movement.

It is a further object of the present invention to provide a frictionally damped cylinder piston device which can be assembled in a most simple and economic way from most simple and easily available components.

SUMMARY OF THE INVENTION

A cylinder piston device comprises a cylinder member having an axis and two ends and further comprising a piston rod member axially movable with respect to said cylinder member through at least one of the two ends. Frictional damping means are provided for damping the axial movement of the piston rod member with respect to the cylinder member. These frictional damping means comprise at least one elastic damping body, having a first portion and a second portion. The first portion is axially fixed to a first member of said cylinder member and said piston rod member, and the second portion is frictionally engageable with a substantially axially extending friction face of a second member of said cylinder member and said piston rod member. The elastic damping body is prestressed against said friction face. The elastic damping body exerts a damping force onto said piston rod member when being axially moved with respect to said cylinder member. This damping force is variable in response to a change of direction of the axial movement.

By the variation of the frictional force in response to the direction of axial movement the behaviour of the cylinder piston device can be adapted to various appliances in which the cylinder piston device is included. E. g., it is frequently necessary that in the damper of a washing machine, the damping action is dependent on the direction of axial movement. Particularly in gas springs used for lifting trunk lids or motor bonnets, different friction forces may be required for the lifting movement and the lowering movement.

According to a preferred embodiment, the second portion may be axially deflectable with respect to the first portion. Thus, axial deflection of said second portion occurs in response to axial movement of the piston rod member with respect to the cylinder member in a predetermined direction. By this axial deflection a change of the damping force occurs.

This preferred embodiment has the advantage of most simple construction and of minimum space requirements within the cylinder piston device.

The second portion of said elastic damping body may be deflectable between a rest position and a position of deflection. The rest position may be defined by a support element axially fixed with respect to the first member. Here, the second portion assumes the rest position in response to axial movement of the piston rod member in a first direction of movement with respect to the cylinder member and assumes the deflected position in response to axial movement of the piston rod member with respect to the cylinder member in a second direction of movement.

The geometry of the elastic damping body may be selected such that the elastic damping body provides an increased axial damping force in the rest position and a reduced axial damping force in the deflected position.

The elastic damping body may be made of various materials, such as synthetic plastic materials, natural and synthetic elastomeric materials. Preferably, the elastic damping bodies have an annular shape about the axis. The damping bodies may be made by usual manufacturing methods known in the art for shaping plastic and elastic materials. E. g., the elastic damping body may be produced by injection moulding.

The support element may have an annular supporting face substantially orthogonal with respect to the axis.

The second portion of the elastic damping body may have a friction face-engagement face engageable with the friction face, which friction face-engagement face is convex towards the friction face when viewed in a plane of section containing the axis. By selecting the radius of curvature of the friction face-engagement face, the degree of variation of the damping force in response to change of axial direction may be influenced.

The second portion of said annular elastic damping body may be provided with recesses opening towards the friction face. Such recesses may be used for providing an additional fluidic damping effect, when the piston rod is moved with respect to the cylinder member. This is particularly true, if the damping body is axially fixed on the piston rod as a piston member or as a part of a piston member.

The annular elastic damping body may have an annular recess about the axis in at least one end face thereof orthogonal with respect to the axis. This annular recess is preferably provided adjacent the second end portion. By such an annular recess the deflecting behaviour of the damping body may be varied.

If a high degree of deflection is desired, the annular elastic damping body may be provided with axial opposite annular recesses in both end faces thereof.

The first portion of the elastic body may be fixed to the cylinder member, and the second portion of said elastic body may thus be engageable with a friction face of the piston rod member. E. g., the elastic damping body may be located within the cylinder member adjacent one end of the cylinder member through which the piston rod member is guided. If a guiding and sealing unit is provided at this end, the elastic damping body may be located adjacent this guiding and sealing unit.

In an alternative embodiment, the elastic damping body is fixed with the first portion thereof with respect to the piston rod member, and the second portion of the elastic damping body is engageable with an internal friction face of the cylinder member. In particular, the elastic damping body may be fixed to an inner end portion of the piston rod member within the cylinder member.

The elastic damping body may be a part of a piston unit provided at the inner end of the piston rod member. As mentioned above, besides the frictional damping, there may be provided a fluidic damping. Such fluidic damping can be achieved in that a throttled passage extends between two working chambers provided on both sides of a piston unit. The throttled passage may be located within the damping body or within another component of a piston unit. It is also possible that the flow resistance of the throttled passage is responsive to the direction of relative movement of the piston rod member on the onehand, and the cylinder member on the other hand.

The principles of the present invention may e.g. be applied to a gas spring in which the cylinder member contains a pressurized gas. Such gas springs are used e.g. for assisting the opening movement of a trunk lid or motor bonnet in a motor-vehicle. The expelling force of the piston rod member is defined by the pressure of the pressurized gas and the cross-sectional area of the piston rod. This expelling force is adapted to the weight of the respective part, i.e. the trunk lid or motor bonnet. The expelling force may exceed the weight of the respective part such that the respective part is moved upwards by the expelling force until respective abutments come into engagement. In this case, no intermediate positions of the respective part can be maintained. It is possible, however, due to the action of the frictional damping means of the present invention to maintain the respective part in an intermediate position. It is only necessary to select the frictional damping means such that the resulting friction force exceeds the difference between the expelling force of the gas spring or gas springs on the one hand and the effective weight of the respective part on the other hand. Such, the assistance of the gas spring for facilitating the opening movement further exists and, nevertheless, the respective part, i.e. trunk lid or motor bonnet, can be located in desired intermediate positions.

An analogous situation occurs, when the gas spring per se is selected such that it cannot lift the respective part without the help of the operator. In such case, the respective part, i.e. trunk lid or motor bonnet, would sink downwards, after the operator has removed his hands from the respective part. If, however, according to the present invention, frictional damping means are provided, these frictional damping means may again be selected so that the friction force exceeds the difference between the weight of the respective part and the expelling force of the gas spring or gas springs. In this case again, the lifting assistance of the gas spring is maintained and nevertheless, the respective part can be located in any desired lifted position.

The overall frictional damping force for opposite directions of movement may be equalized by a combination of at least two elastic damping bodies.

The principle of this invention can also be applied to hydraulic dampers such that besides the velocity dependent fluidic damping action, a frictional damping action exists.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to an embodiment shown in the accompanying drawings in which FIG. 1 shows a partial section of a gas spring;

FIG. 2 shows a longitudinal section of an elastic damping body to be used in a gas spring according to FIG. 1;

FIG. 3 shows an end view of the elastic damping body of FIG. 2;

FIG. 8 shows a detail for an alternative elastic damping body in a gas spring according to FIG. 6; and

DETAILED DESCRIPTION OF THE PREFERRED EMBODIMENTS

Figure 4:
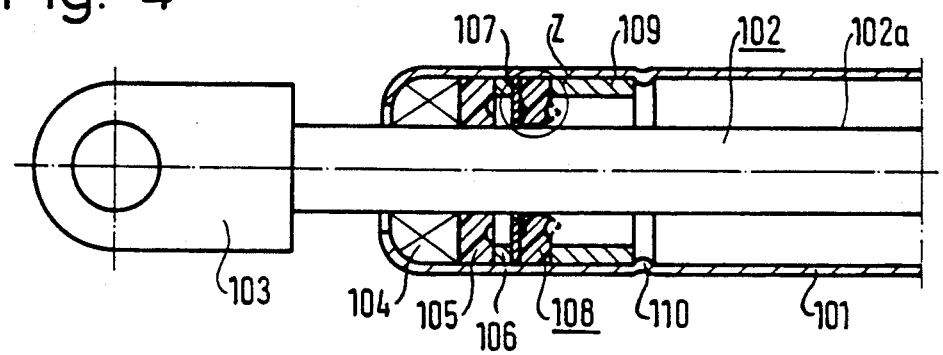
FIG. 4 shows a modification of the gas spring of FIG. 4.

In FIG. 1, the cylinder of a gas spring is designated by 1, and the piston rod member is designated by 2. The piston rod member 2 is guided through a sealing member 5 and a guiding member 4 at one end of the cylinder. The piston rod member 2 is provided with a connection eye 3 for fastening the gas spring to a construction such as the body work or a movable part of a motor-vehicle. An annular elastic damping body 8 is clamped between a support plate 7 and a support sleeve 9. The support plate 7 is supported by a spacer ring 6, and the support sleeve 9 is axially fixed by a bead 10.

The annular elastic damping body is shown in more detail in FIGS. 2 and 3. The elastic damping body 8 comprises a radially outer portion 8a which is to be clamped between the support plate 7 and the support sleeve 9. Further, the elastic damping body 8 comprises a radially inner portion 8b. This radially inner portion is provided with radially inwards open slots 8c. The radial inward portion 8b is in contact with the circumferential face 2a of the piston rod member 2. On axial inward movement of the piston rod member 2, the elastic damping body 8 takes the position as shown in FIG. 1. The friction force is relatively small. When the piston rod member 2 moves in axial outward direction, the elastic damping body approaches the support plate 7. Thus, the radial compression of the elastic damping body is increased, and the friction force is also increased.

The deflection properties of the elastic damping body can be controlled by the number and cross-section of the slots 8c.

The elastic damping body 8 is made of a plastic or elastomeric material, e.g. a foamed polyurethane material. The elastic damping body may be wetted with a lubricant agent for controlling the friction properties. It is to be noted that FIGS. 2 and 3 show a most simple elastic damping body having a constant profile along its axis and end faces orthogonal to said axis. This elastic damping body may be easily manufactured in mass production, e.g. by extrusion. The gas spring of FIG. 1 is most adapted for assisting the lifting movement of a trunk lid or motor bonnet: on outward movement of the piston rod member 2 corresponding to lifting movement of the respective vehicle part, there exists a hight friction force. This friction force is larger than the difference between the expelling force of the piston rod member and the effective weight of the vehicle part. Such, the vehicle part comes to a standstill in any position, when the operator stops a manual lifting effect. On inward movement, corresponding to lowering movement of the vehicle part, only a small frictional resistance must be overcome.

Figure 5:
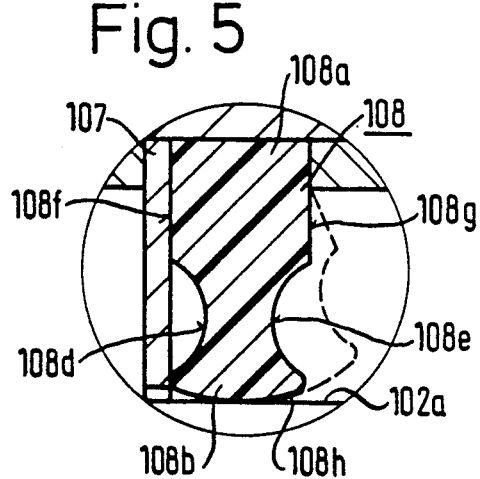
FIG. 5 shows a detail at the location Z of FIG. 4.

In the embodiment of FIG. 4, analogous parts are designated by the same reference numbers as in the embodiments of FIGS. 1 to 3 increased by 100. The elastic damping body 108 has a modified shape. This damping body 108 is provided with annular recesses 108d and 108e in the end faces 108f and 108g. The radially outer circumferential surface 108h is convex The curve defining the convex face 108h is responsible for the variation of frictional damping force in response to change of direction of movement. In the embodiment as shown in FIG. 5, the friction force is at a maximum on outward movement of the piston rod member as shown in FIG. 4, when the elastic damping body 108 is fully supported by the support plate 107. When the piston rod member 102 is moved inwards as shown in FIG. 4, a reduced damping force exists.

Figure 7:
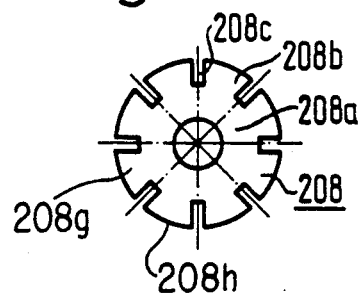
FIG. 7 shows an end view of an elastic damping body as used in FIG. 6.
Figure 6:
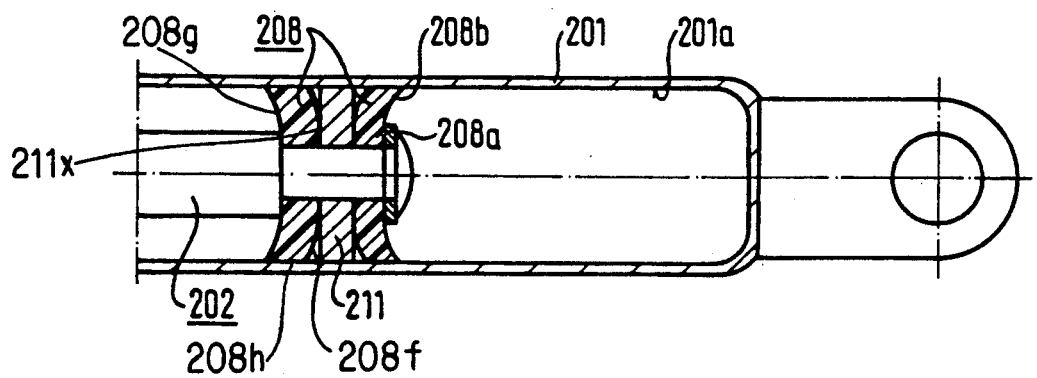
FIG. 6 shows an alternative embodiment of a gas spring.

In FIG. 6 and 7, a third embodiment is shown, in which two damping bodies 208 are fixed to the inner end of the piston rod 202 on both sides of a common support plate 211. The elastic damping bodies 208 have the shape as shown in FIG. 7, similar to the shape as shown in FIGS. 2 and 3. Alternatively, the elastic damping bodies 208 could also have a shape as shown in FIG. 5 with the convex circumferential face engaging the internal surface of the cylinder 201.

In this embodiment, the right-hand damping body 208 provides a larger frictional force on inward movement and a smaller frictional force on outward movement of the piston rod member 202. On the other hand, the left-hand damping body 208 provides a smaller frictional force on inward movement and a larger frictional force on outward movement. By making the damping bodies 208 identic, one can achieve that the resulting frictional force resisting inward and outward movement of the piston rod member 202 is equal.

It is, however, also possible that different damping bodies 208 are used on both sides of the support plate 211 such that the frictional resistance to the movement of the piston rod 202 is different in response to change of direction of movement.

Both damping bodies 208 have a first or radially inner portion 208a, a second or radially outer portion 208b and slots 208c. The respective radially outer portion is in frictional engagement with an internal face 201a of the cylinder 201.

A damping body 208 is shown with end faces 208f and 208g, and a friction-face-engagement face 208h. The support plate 211 is shown with a support face 211x.

In the detail shown in FIG. 8, reference numerals are used consistent with FIG. 6 and 7, and additional preferred annular recesses 208d and 208e are shown in end faces 208f and 208g.

While specific embodiments of the invention have been shown and described in detail to illustrate the application of the inventive priciples, it will be understood that the invention may be embodied otherwise without departing from such principles.

The reference numerals in the claims are only used for faciliatiting the understanding and are by no means restrictive.

I claim:

1. A cylinder piston device comprising a cylinder member (201) having an axis and two ends, a piston rod member (202) axially movable with respect to said cylinder member (201) through at least one of said two ends, and frictional damping means (208) for damping the axial movement of said piston rod member (202) with respect to said piston cylinder member (201) and comprising at least one elastic damping body (208) having a radially inner portion (208a) which is axially fixed to said piston rod member (202) and a radially outer portion (208b) which is frictionally engageable with a substantially axially extending friction face (201a) of said cylinder member (201) and which is prestressed against said friction face (201a) for exertion of a damping force onto said piston rod member (202) during axial movement with respect to said cylinder member (201, variable in response to a change of direction of said axial movement;

said elastic damping body (208) having two axially spaced end faces (208f, 208g) substantially perpendicular to said axis, and a radially outer friction-face-engagement face (208h) confining said radially outer portion (208b) in a radially outward direction, said friction-face-engagement face (208h) being generally parallel to and engaging said friction face (201a);

a support element (211) being axially fixed on said piston rod member (202) and having at least one support face (211x) axially adjacent a first one (208f) of said end faces (208f, 208g) and extending radially across said radially inner portion (208a) and said radially outer portion (208b);

said radially outer portion (208b) being maintained by frictional action in a rest position adjacent said support face (211x) in response to axial movement of said piston rod member (202) in a first direction of movement in which said elastic damping body (208) is ahead of said support element (211, and being lifted by frictional action from said support face (211x) toward a deflected position in response to axial movement of said piston rod member (202)

in a second direction of movement opposite to said first direction of movement;

said damping force being greater on movement of said piston rod member (202) in said first direction as compared with movement in said second direction;

said first end face (208f) being substantially convex and said second end face (208g) being substantially concave in said deflected position of said radially outward portion (208b), and said first and second end faces (208f, 208g) being substantially planar in said rest position; and said elastic damping body (208) comprising at least one passage (208c) for passage of fluid on movement of said piston rod member (202) relative to said cylinder member (201).

2. A cylinder piston device as set forth in claim 1, said elastic damping body (208) having an annular shape about said axis.

3. A cylinder piston device as set forth in claim 2, said annular elastic damping body (208) having an annular recess (208d, 208e) about said axis in at least one of said end faces (208f, 208g), said annular recess (208d, 208e) being provided adjacent said radially outer portion (208b).

4. A cylinder piston device as set forth in claim 3, said annular elastic damping body (208) being provided with axial opposite annular recesses (208d, 208e) in both end faces (208f, 208g) thereof.

5. A cylinder piston device as set forth in claim 1, said friction-face-engagement face (208h) being convex towards said friction face (201a) when viewed in a plane of section containing said axis.

6. A cylinder piston device as set forth in claim 1, said radially outer portion (208b) of said elastic damping body (208) being provided with substantially radially extending slots (208c) opening towards said friction face (201a).

7. A cylinder piston device as set forth in claim 1, said elastic damping body (208) being fixed to an inner end portion of said piston rod member (202) within said cylinder member (201).

8. A cylinder piston device as set forth in claim 7, said elastic damping body (208) being part of a piston unit (211,208) provided at the inner end of said piston rod member (202).

9. A cylinder piston device as set forth in claim 8, said piston unit (211,208) comprising two annular elastic damping bodies (208) and a support disc (211) therebetween, respective radially outer portions (208b) of said two annular elastic damping bodies (208) being deflectable in axial opposite directions.

10. A cylinder piston device as set forth in claim 1, said cylinder piston device being a gas spring comprising at least one chamber containing a pressurized gas.

11. A cylinder piston device as set forth in claim 1, said cylinder piston device being an oscillation damper.

12. A cylinder piston device as set forth in claim 1, said elastic damping body (208) being made of a plastic material.

13. A cylinder piston device as set forth in claim 12, said plastic material being elastomeric.

14. A cylinder piston device as set forth in claim 1, comprising a combination of at least two elastic damping bodies (208) deflectable in opposite axial directions.

* * * * *